United States Patent
Gomila et al.

(10) Patent No.: US 7,738,721 B2
(45) Date of Patent: Jun. 15, 2010

(54) METHOD AND APPARATUS FOR MODELING FILM GRAIN PATTERNS IN THE FREQUENCY DOMAIN

(75) Inventors: Cristina Gomila, Princeton, NJ (US); Joan Llach, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 661 days.

(21) Appl. No.: 10/569,318

(22) PCT Filed: Apr. 7, 2004

(86) PCT No.: PCT/US2004/010789

§ 371 (c)(1),
(2), (4) Date: Feb. 22, 2006

(87) PCT Pub. No.: WO2005/027045

PCT Pub. Date: Mar. 24, 2005

(65) Prior Publication Data

US 2006/0292837 A1    Dec. 28, 2006

Related U.S. Application Data

(60) Provisional application No. 60/498,945, filed on Aug. 29, 2003.

(51) Int. Cl.
*G06K 9/00* (2006.01)
*G06K 9/40* (2006.01)
*G06K 9/38* (2006.01)
*G09G 5/00* (2006.01)
*G06T 15/50* (2006.01)
*G06T 15/60* (2006.01)
*H04N 5/262* (2006.01)
*H04N 9/74* (2006.01)

(52) U.S. Cl. ............. 382/254; 382/181; 382/260; 382/261; 382/262; 382/263; 382/264; 382/275; 345/581; 345/582; 345/426; 348/239; 348/578

(58) Field of Classification Search ............... None
See application file for complete search history.

(56) References Cited

U.S. PATENT DOCUMENTS 4,935,816 A * 6/1990 Faber .................. 348/578

(Continued)

FOREIGN PATENT DOCUMENTS

EP    0622000    10/1992

(Continued)

OTHER PUBLICATIONS http://web.archive.org/web/20040420183648/http://gimpguru.org/Tutorials/FilmGrain/.*

(Continued)

*Primary Examiner*—Vikkram Bali
*Assistant Examiner*—Michelle Entezari
(74) *Attorney, Agent, or Firm*—Robert D. Shedd; Robert B. Levy

(57) ABSTRACT

Film grain patterns can be modeled in the frequency domain by estimating the cut frequencies that define a 2D band-pass filter. The film grain parameters can be conveyed in accordance with the ITU-T H.264|MPEG-4 AVC standard in an SEI message allowing film grain reinsertion at a decoder.

12 Claims, 2 Drawing Sheets

U.S. PATENT DOCUMENTS

| | | | |
|---|---|---|---|
| 5,140,414 A * | 8/1992 | Mowry | 348/577 |
| 5,216,556 A * | 6/1993 | Steinberg et al. | 360/74.3 |
| 5,335,013 A | 8/1994 | Faber | |
| 5,374,954 A | 12/1994 | Mowry | |
| 5,406,326 A | 4/1995 | Mowry | |
| 5,457,491 A | 10/1995 | Mowry | |
| 5,471,572 A | 11/1995 | Buchner et al. | |
| 5,475,425 A | 12/1995 | Przyborski et al. | |
| 5,526,446 A * | 6/1996 | Adelson et al. | 382/275 |
| 5,629,769 A | 5/1997 | Cookingham et al. | |
| 5,641,596 A * | 6/1997 | Gray et al. | 430/21 |
| 5,687,011 A | 11/1997 | Mowry | |
| 5,709,972 A | 1/1998 | Cookingham et al. | |
| 5,767,860 A | 6/1998 | Zimmer et al. | |
| 5,831,673 A * | 11/1998 | Przyborski et al. | 348/239 |
| 5,887,075 A * | 3/1999 | Kruppa | 382/139 |
| 6,067,125 A * | 5/2000 | May | 348/607 |
| 6,269,180 B1 | 7/2001 | Sevigny | |
| 6,285,711 B1 * | 9/2001 | Ratakonda et al. | 375/240.16 |
| 6,327,391 B1 * | 12/2001 | Ohnishi et al. | 382/236 |
| 6,496,221 B1 * | 12/2002 | Wolf et al. | 348/192 |
| 6,839,152 B2 * | 1/2005 | Fan et al. | 358/3.08 |
| 6,995,793 B1 * | 2/2006 | Albadawi et al. | 348/239 |
| 7,362,911 B1 * | 4/2008 | Frank | 382/260 |
| 2002/0003903 A1 * | 1/2002 | Engeldrum et al. | 382/233 |
| 2002/0034337 A1 * | 3/2002 | Shekter | 382/275 |
| 2002/0106103 A1 * | 8/2002 | Jones et al. | 382/100 |
| 2003/0068097 A1 * | 4/2003 | Wilson et al. | 382/276 |
| 2004/0006575 A1 * | 1/2004 | Visharam et al. | 707/104.1 |
| 2004/0022318 A1 * | 2/2004 | Garrido et al. | 375/240.11 |
| 2004/0179738 A1 * | 9/2004 | Dai et al. | 382/218 |
| 2004/0264795 A1 * | 12/2004 | Fielding | 382/254 |
| 2007/0002947 A1 * | 1/2007 | Lu et al. | 375/240.12 |

FOREIGN PATENT DOCUMENTS

| | | |
|---|---|---|
| EP | 1175091 | 1/2002 |
| EP | 1215624 | 6/2002 |
| RU | 2088962 C1 | 8/1997 |
| WO | WO92/06409 | 4/1992 |
| WO | WO9314591 | 7/1993 |
| WO | WO9520292 | 7/1995 |
| WO | WO9722204 | 6/1997 |
| WO | WO0146992 | 6/2001 |
| WO | WO0177871 | 10/2001 |
| WO | 2004/495829 A1 | 11/2004 |
| WO | 2004/105250 A2 | 12/2004 |
| WO | WO2004104931 | 12/2004 |

OTHER PUBLICATIONS

Search Report dtd. Aug. 24, 2004.

Gomila, Cristina et. al., SIE Message for Film Grain Encoding. Joint Video Team (JVT) of ISO/IEC MPEG & ITU-T VCEG (ISO/IEC JTC1/SC29/WG11 and ITU-T SG16 Q.6. 8th Meeting: Geneva, CH, May 23-27, 2003.

Al-Shaykh et al, "Lossy Compression of Images Corrupted by Film Grain Noise," School of Electrical and Computer Engineering, 1996 IEEE.

Al-Shaykh et al, "Restoration of Lossy Compressed Noisy Images," IEEE Transactions on Image Processing, vol. 8, No. 10, Oct. 1999.

Al-Shaykh, "Lossy Compression of Noisy Images," IEEE Transactions on Image Processing, vol. 7, No. 12, Dec. 1998.

Brightwell et al, "Automated Correction of Film Unsteadiness, Dirt and Grain," International Broadcasting Convention, Sep. 16-20, 1994, Conference Publication No. 397, IEE, 1994.

Campisi et al, "Signal-Dependent Film Grain Noise Generation Using Homomorphic Adaptive Filtering," IEE Proceedings, Image Signal Process, vol. 147, No. 3, Jun. 2000.

Zhao et al, "Constant Quality Rate Control for Streaming MPEG-4 Fgs. Video," Integrated Media Systems Center and Department of Electrical Engineering, University of Southern California, 2000 IEEE.

Chavel et al, "Film Grain Noise in Partially Coherent Imaging," Optical Engineering, vol. 19, No. 3, May-Jun. 1980.

Fischer et al, "Image Sharpening Using Permutation Weighted Medians," Department of Electrical Engineering, University of Delaware, fischer@ee.udel.edu, paredesj@ee.udel.edu, arce@ee.udel.edu.

Illingworth et al, "Vision, Image and Signal Processing," The Institution of Electrical Engineers, IEE Proceedings, Jun. 2000, vol. 147, No. 3.

McLean et al, "Telecine Noise Reduction," XP-002285972, 2001 The Institute of Electrical Engineers.

Oktem et al, "Transform Domain Algorithm for Reducing Effect of Film-Grain Noise in Image Compression," Electronics Letters, Oct. 14, 1999, vol. 35, No. 21.

Prades-Nebot et al, "Rate Control for Fully Fine-Grained Scalable Video Coders," Visual Communications and Image Processing 2002, Proceedings of SPIE, vol. 4671 (2002), SPIE 0277-786X/02.

Schaar et al, "Fine-Granularity-Scalability for Wireless Video and Scalable Storage," Visual Communications and Image Processing 2002, Proceedings of SPIE, vol. 4671 (2002) SPIE 0277-786X/02.

Shahnaz et al, "Image Compression in Signal-Dependent Noise," Applied Optics, vol. 38, No. 26, Sep. 10, 1999.

Yan et al, "Efficient Video Coding with Hybrid Spatial and Fine-Grain SNR Scalabilities," Department of Electronic Engineering, Beijing Institute of Technology, China.

Yan et al, "Film Grain Noise Removal and Generation for Color Images," Department Electrical and Computer Engineers, University of Toronto, dimitris@comm.toronto.edu.

Yan et al, "Signal-Dependent Film Grain Noise Removal and Generation Based on Higher-Order Statistics," University of Toronto, Department of Electrical and Computer Engineering, dimitris@comm.toronto.edu, 1997 IEEE.

Yoshida, "Go with the Grain, Film R&D Chief Urges, for Art's Sake," EE Times, Feb. 7, 2005.

Zhang et al, "Constant Quality Constrained Rate Allocation for FGS Video Coded Bitstreams," Visual Communications and Image Processing 2002, Proceedings of SPIE, vol. 4671 (2002) SPIE 0277-786X/02.

Peng et al, "Adaptive Frequency Weighting for Fine-Granularity-Scalability," Visual Communications and Image Processing 2002, Proceedings of SPIE, vol. 4671 (2002) SPIE 0277-786X/02, pp. 840-849.

U.S. Appl. No. 10/556,834, filed Aug. 19, 2008 Office action in related case.

U.S. Appl. No. 10/556,834, filed Feb. 20, 2009 Office action in related case.

U.S. Appl. No. 11/252,177, filed Nov. 5, 2008 Office action in related case.

U.S. Appl. No. 11/252,177, filed Apr. 17, 2009 Office action in related case.

* cited by examiner

METHOD AND APPARATUS FOR MODELING FILM GRAIN PATTERNS IN THE FREQUENCY DOMAIN

CROSS-REFERENCE TO RELATED APPLICATIONS

This application claims the benefit, under 35 U.S.C. §365 of International Application PCT/US04/010789, filed Apr. 7, 2004, which was published in accordance with PCT Article 21(2) on Mar. 24, 2005 in English and which claims the benefit of U.S. provisional patent application No. 60/498,945, filed Aug. 29, 2003.

TECHNICAL FIELD

This invention relates to a technique for modeling film grain patterns in the frequency domain.

BACKGROUND ART

Motion picture film typically contains signal-dependent noise, often referred to as film grain, resulting from the process of exposure and development of the photographic film. Such noise yields a characteristic quasi-random pattern or texture, caused by the physical granularity of the photographic emulsion. Alternatively, signal-dependent noise can occur as result of subsequent editing of the images. The grain pattern can be simulated for video compression purposes.

The ITU-T H.264|MPEG-4 AVC video compression standard has accepted in its Fidelity Range Extensions Amendment the inclusion of a film grain SEI (Supplemental Enhancement Information) message. The film grain SEI message conveys a series of parameters allowing film grain simulation at the receiver. For the ITU-T H.264|MPEG-4 AVC compression standard, parameters in the SEI message can be specified according to two different models: the auto-regressive model and the frequency-filtering model. Both models allow characterizing the film grain pattern (size and shape), intensity and color correlation through different sets of parameters for different intensity levels. In particular, the frequency-filtering model characterizes the film grain pattern by specifying a set of cut frequencies that define a 2D band-pass filter in the frequency domain. Note that ITU-T H.264|MPEG-4 AVC only standardizes the syntax necessary to transmit the cut frequencies but does not provide a method for computing them for a video sequence with film grain.

Thus, there exists a need for a technique allowing the automatic modeling of the film grain pattern in the frequency domain as specified by the frequency-filtering model in ITU-T H.264|MPEG-4 AVC compression standard. Results for this technique could be used either for automatic film grain modeling applications or as the initialization step for a film grain assisted-modeling process.

BRIEF SUMMARY OF THE INVENTION

Briefly, in accordance with a preferred embodiment, there is provided a method for modeling (i.e., characterizing) film grain patterns in the frequency domain. The method comprises the steps of (1) transforming an set of homogeneous film grain samples received as an input to the process to the frequency domain, thereby yielding a set of transform coefficients having a particular pattern; (2) analyzing the pattern created by the transformed coefficients; and (3) estimating the cut frequencies of a 2D frequency filter that can effectively simulate the pattern of transform coefficients by filtering random noise. The cut frequencies established by this method can be conveyed in an SEI message in accordance with the ITU-T H.264|MPEG-4 AVC standard allowing film grain simulation and reinsertion at a decoder.

DETAILED DESCRIPTION

Figure 1:
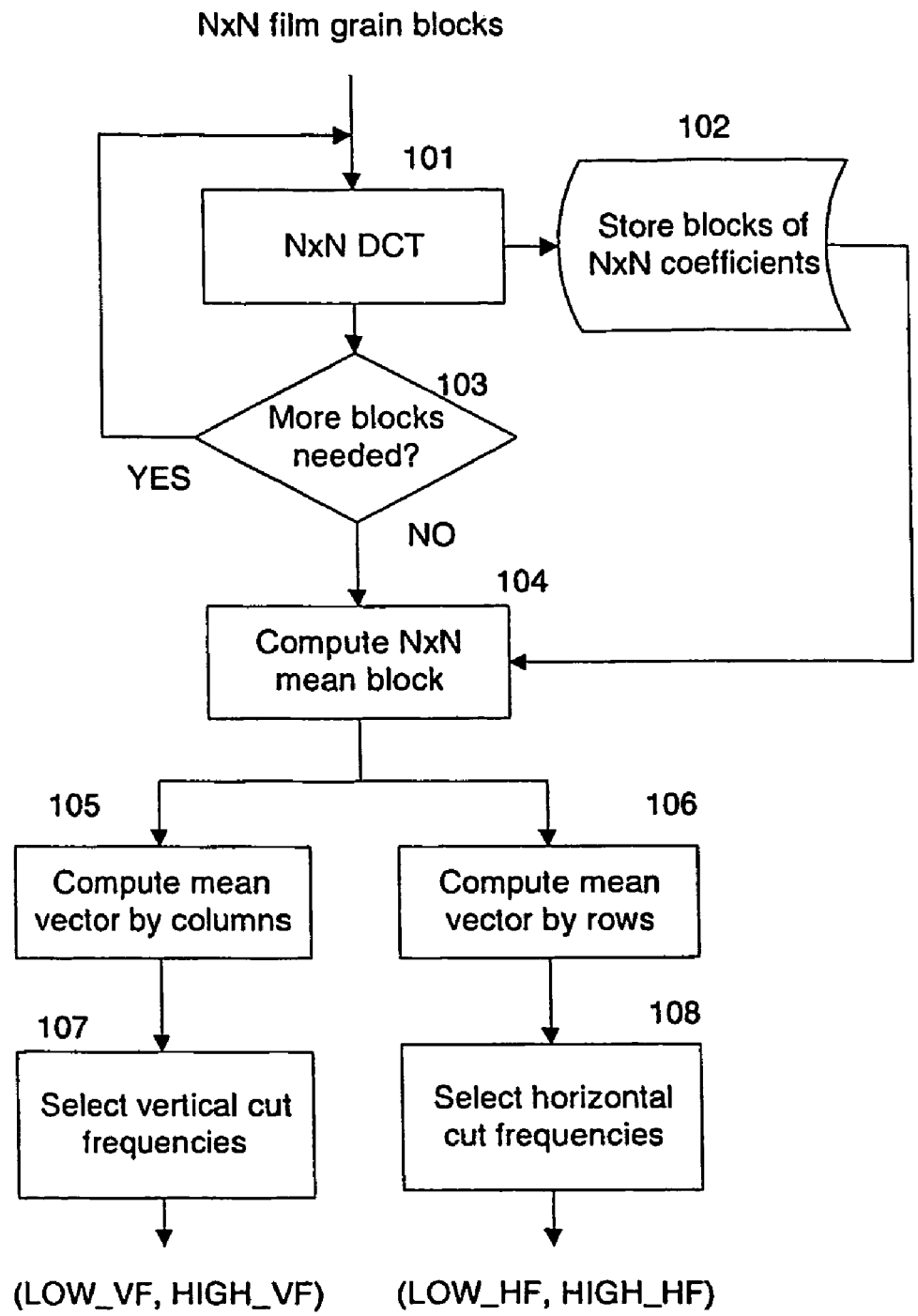
FIG. 1 depicts in flow chart form the steps of a method for characterizing film grain patterns in accordance with the present principles.

FIG. 1 depicts in flow chart form the steps of a method in accordance with present principles for modeling a film grain pattern in the frequency domain upon receipt of a series of film grain samples representing a homogeneous film grain pattern. As discussed in greater detail hereinafter, the method of the present principles parameterizes the pattern of the input samples by analyzing the size and shape of the structures forming the grain. Because grain can form differently depending on film exposure, homogeneous film grain samples are typically those associated with similar luminance values measured on the film image. Film grain samples at the input of the process could be any group (or groups) of neighboring pixels that retains information about the film grain size and shape. In the illustrated embodiment, we will assume for simplicity that the film grain samples are arranged in square blocks of N×N pixels with a particular transform implementation based on a DCT of squared blocks of N×N pixels, although other transforms, such as a Fast Fourier Transform work equally as well.

The method of the present principles assumes that modeling of the film grain present in $I_{grain}[x, y, c]$ occurs in accordance with the relationship:

$$I_{grain}[x,y,c] = I_{without\ grain}[x,y,c] + G[x,y,c] \tag{1}$$

where G[x, y, c] represents the simulated grain at pixel coordinates (x, y) for color component c. G[x, y, c] is computed as:

$$G[x,y,c] = p^*Q[x,y,c] + u^*G[x,y,c-1] \tag{2}$$

where the parameter p is the standard deviation of the random noise and the parameter u models the cross-color correlation among different color components. More particularly, the term Q[c] comprises a two-dimensional random field generated by filtering blocks b of N×M random values, which have been generated with a normalized Gaussian distribution N(0, 1). In a particular embodiment, the band-pass filtering of blocks b can be performed in the frequency domain by the following three steps:

Step 1: Transform $$B = DCT\_N \times M(b)$$

Step 2: Frequency Filtering

```
for( y=0; y<N; y++)
    for( x= 0; x<M; x++)
        if ( (x < LOW_HF && y < LOW_VF) ||
            x > HIGH_HF || y > HIGH_VF)
            B[x, y] = 0;
``` where LOW_HF and LOW_VF are the low Horizontal and Vertical cut frequencies, respectively, and HIGH_HF and HIGH_VF are the high Horizontal and Vertical cut frequencies, respectively. The cut frequencies define the boundaries between preserved and filtered coefficients when a film grain image is mapped in the frequency domain and serve to characterize the size of the grain.

Step 3: Inverse Transform $$b' = IDCT\_N{\times}M(B)$$

Finally, Q[c] is formed by combining the filtered blocks b' into a composite image. Low pass filtering of the block transitions will reduce possible "blockiness." Although M and N could take any value, in practice squared blocks of 16×16, 8×8 or 4×4 pixels work best. Note also that other transforms, such as the Fast Fourier Transform (FFT), could replace the DCT process in Steps 1 and 3.

By these principles, modeling the film grain patterns is equivalent to extracting the cut frequencies LOW_HF, LOW_VF, HIGH_HF and HIGH_VF that characterize the band-pass filter in the frequency domain.

The method of the present principles commences upon execution of step 101, in which each block of N×N pixels undergoes a Discrete Cosine Transform, with subsequent storage of the resulting arrays of N×N coefficients during step 102. During step 103, a check occurs to decide whether a need exists for more blocks with film grain samples in order to obtain more coefficients for storage. Ordinarily, all blocks of film grain samples available at the input undergo a transform. However, to reduce memory requirements or computational load, processing could stop after a certain number of blocks have undergone a transform. Following storage of a sufficient number of transformed blocks, step 104 occurs, whereupon a mean block ($B_{mean}$) is computed by averaging the coefficients from all the stored blocks. Assuming K as the number of stored blocks, the averaging process for the coefficient at position [x,y] can be formulated as follows:

$$B_{mean}[x, y] = \frac{1}{K}\sum_{i=0}^{K-1} B_i[x, y] \qquad (3)$$

Next, steps 105 and 106 occur typically in parallel. During step 105, a horizontal mean vector $B_H$ is computed by averaging the N frequency coefficients of each row of $B_{mean}$ in accordance with the relationship:

$$B_H[y] = \frac{1}{N}\sum_{n=0}^{N-1} B_{mean}[n, y] \qquad (4)$$

In a particular embodiment, it is possible to avoid the influence of the DC coefficient on the average of the first row with the relationship:

$$B_H[0] = \frac{1}{N-1}\sum_{n=1}^{N-1} B_{mean}[n, 0]$$

During step 106, the vertical mean vector is computed by averaging the N frequency coefficients of each column of $B_{mean}$ in accordance with the relationship:

$$B_V[x] = \frac{1}{N}\sum_{n=0}^{N-1} B_{mean}[x, n] \qquad (5)$$

In a particular embodiment, it is possible to avoid the influence of the DC coefficient on the average of the first column with the relationship:

$$B_V[0] = \frac{1}{N-1}\sum_{n=1}^{N-1} B_{mean}[0, n]$$

From the frequency vectors, selection of the horizontal and vertical cut frequencies occurs during steps 107 and 108, respectively, to estimate the film grain size. As seen in FIG. 1, steps 107 and 108 typically occur in parallel. Horizontal cut-frequency selection during step 107 occurs in the following manner. First, the components in the horizontal mean vector undergo low-pass filtering to avoid spurious peaks. In the illustrated embodiment, such low pass filtering of the horizontal mean vector occurs by convolving the mean vector with a filter of impulse response h[n] in accordance with the relationship:

$$B'_H[n] = \sum_{i=1}^{n} B_H[i]h[n-i] = (B_H * h)[n] \qquad (6)$$

For example, a 3-tap linear filter with coefficients $w_0$, $w_1$, and $w_2$ could be applied to each coefficient in accordance with the relationship:

$$B'_H[n] = w_0 \cdot B_H[n-1] + w_1 \cdot B_H[n] + w_2 \cdot B_H[n+1],$$
$$0 \leq n \leq N-1 \qquad (7)$$

Observe that in order to apply the filtering on the edges of the mean vector B it is necessary to pad the original mean vector so that the samples for n<0 and n>N−1 are defined.

Next, the mean value of $B'_H$ is computed by averaging its components in accordance with the relationship:

$$\overline{B}'_H = \frac{1}{N}\sum_{n=0}^{N-1} B'_H[n] \qquad (8)$$

Thereafter, the vector $B'_H$ is represented as a curve, and its intersection points with the average value $\overline{B}'_H$ are computed. If a single intersection point is found, the index n of the closest component in $B'_H$ is chosen as the value of the horizontal high cut frequency; the horizontal low cut frequency is assumed to be 0. If two intersection points are found, the indexes of the closest components are found for each one. The lowest value will correspond to the low horizontal cut frequency whereas the highest value will correspond to the high horizontal cut frequency. If more than two intersection points are found, no spatial correlation is detected. The horizontal low cut frequency is assumed to be 0, and the horizontal high cut frequency is assumed to be N−1, indicating to the film grain simulation function that no frequency filtering is required to imitate the original grain.

The same procedure described for selecting the horizontal cut frequency occurs during step 108 to select the vertical cut frequency using the vertical frequency vector $B_V$. At the completion of steps 107 and 108, the method of FIG. 1 yields four cut frequencies (LOW_HF, HIGH_HF, LOW_VF, HIGH_VF) that characterize both the size and the elongation of the grain. Elongated grain occurs when LOW_HF≠LOW_VF and/or HIGH_HF≠HIGH_VF.

Figure 2:
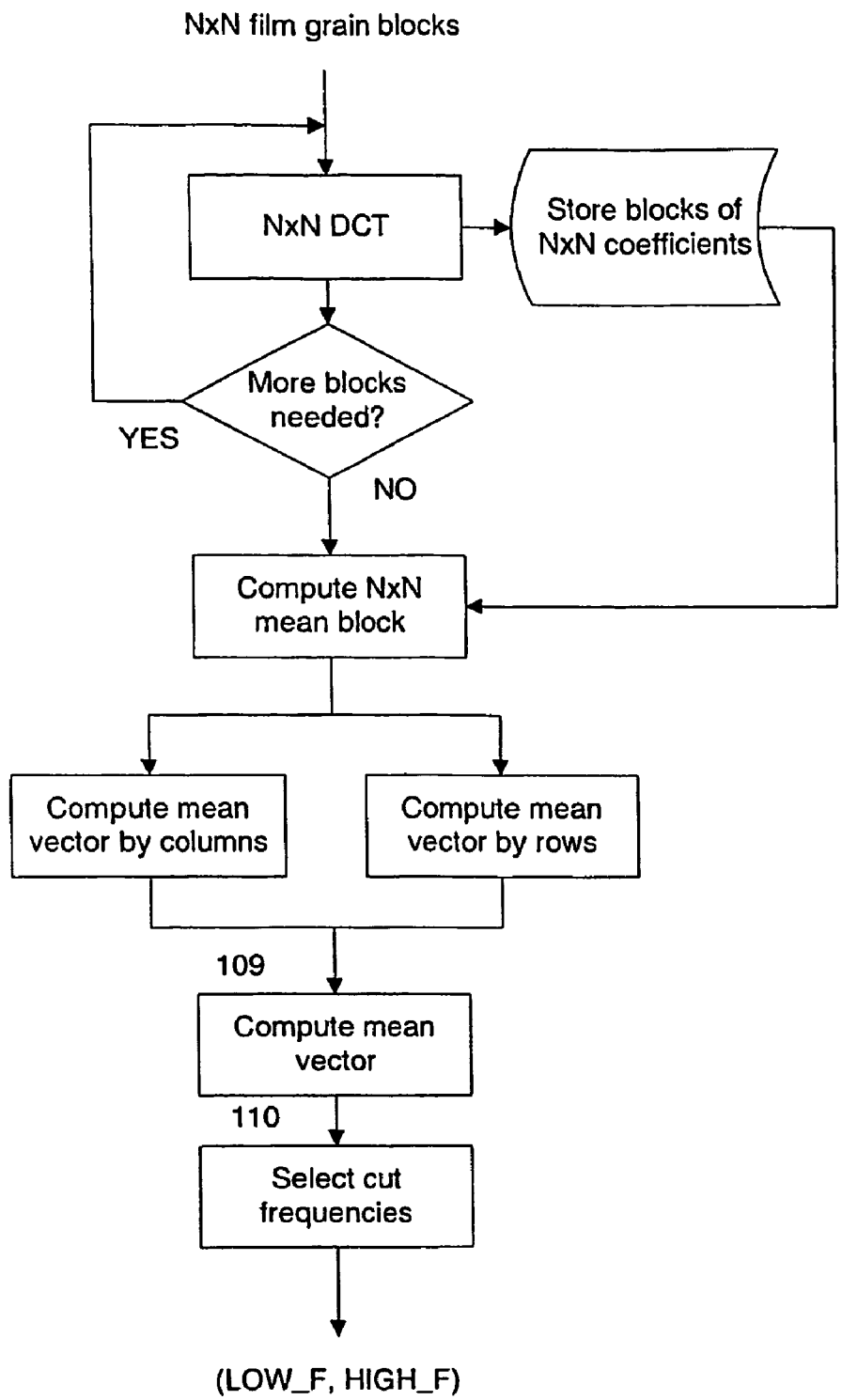
FIG. 2 depicts in flow chart form a variation of film grain characterization method of FIG. 1.

FIG. 2 illustrates an alternative grain modeling method, where it is possible to constrain the grain to circular shapes. This implies that the horizontal and vertical cut frequencies remain the same. The method of FIG. 2 contains many steps in common with the method of FIG. 1. Therefore, like reference numerals have been used in FIG. 2 as in FIG. 1 to describe like steps. The method of FIG. 2 differs from that of FIG. 1 in that, the vertical and horizontal frequency vectors ($B_H$ and $B_V$) are averaged during step 109 of FIG. 2 to create single frequency vector (B). Then, the same procedure is performed during steps 107 and 108 in FIG. 2 to estimate low and high cut frequencies as is performed during steps 107 and 108 of FIG. 1.

The foregoing describes a technique for modeling a film grain pattern in the frequency domain.

The invention claimed is:

1. A method executed by a decoder for automatically modeling film grain patterns for insertion in a video sequence, comprising the steps of:
   transforming a set of film grain samples to the frequency domain;
   storing each set of coefficients resulting from such transform, the coefficients forming a pattern;
   analyzing the pattern created by the transform coefficients; and
   estimating the cut frequencies of a 2D band-pass filter that can effectively simulate the pattern of transform coefficients by filtering random noise in a frequency domain.

2. The method according to claim 1 further comprising the step of transmitting at least one cut frequency in a Supplemental Enhancement Information message.

3. The method according to claim 1 wherein the film grain samples are processed in blocks of N×N pixels.

4. The method according to claim 3 wherein the step of analyzing the pattern created by the transform coefficients further comprises the steps of:
   computing a mean block of N×N transform coefficients by averaging the transform coefficients from all the stored blocks;
   defining horizontal and vertical mean vectors of N components each by averaging the mean block of N×N coefficients along rows and columns, respectively, of each transformed block;
   representing the horizontal and vertical mean vectors as separate curves; and
   establishing horizontal and vertical cut frequencies from the curves represented by the horizontal and vertical mean vectors, respectively.

5. The method according to claim 4 further comprising the step of low pass filtering at least one mean vector.

6. The method according to claim 4 wherein the at least one cut frequency is established from an intersection point in the curve representing the mean vector.

7. The method according to claim 4 wherein each of a low and a high cut frequency is established from a first and second intersection points in the curve representing the mean vector.

8. The method according to claim 3 wherein the step of analyzing the pattern created by the transform coefficients further comprises the steps of:
   computing a mean block of N×N transform coefficients by averaging the transform coefficients from all the stored blocks;
   defining horizontal and vertical mean vectors of N components each by averaging the mean block of N×N transform coefficients along rows and columns, respectively, of each transformed block; averaging the horizontal and vertical mean vectors into a single mean vector;
   representing the mean vectors as a curve; and establishing horizontal and vertical cut frequencies from the curve represented by the mean vector.

9. The method according to claim 8 further comprising the step of low pass filtering the mean vector.

10. The method according to claim 8 wherein at least one cut frequency is established from an intersection point in the curve representing the mean vector.

11. The method according to claim 8 wherein each of a low and a high cut frequency is established from a first and second intersection points in the curve representing the mean vector.

12. A method executed by a decoder for automatically modeling film grain patterns for insertion in a video sequence, comprising the steps of:
   receiving a set of film grain samples performing a transform on the set of film grain samples to the frequency domain;
   storing each set of coefficients resulting from such transform, the coefficients forming a pattern;
   analyzing the pattern created by the transform coefficients; and
   estimating the cut frequencies of a 2D band-pass filter that can effectively simulate the pattern of transform coefficients by filtering random noise in a frequency domain.

* * * * *